(12) United States Patent
Wolf

(10) Patent No.: US 10,981,443 B2
(45) Date of Patent: Apr. 20, 2021

(54) MOTOR VEHICLE FRONT END

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/377,278

(22) Filed: Apr. 8, 2019

(65) Prior Publication Data

US 2019/0329645 A1 Oct. 31, 2019

(30) Foreign Application Priority Data

Apr. 27, 2018 (DE) .............. 10 2018 110 258.5

(51) Int. Cl.
*B60K 11/08* (2006.01)
*B62D 35/02* (2006.01)
*B62D 35/00* (2006.01)
*F01P 11/10* (2006.01)

(52) U.S. Cl.
CPC .......... *B60K 11/085* (2013.01); *B62D 35/005* (2013.01); *B62D 35/02* (2013.01); *F01P 11/10* (2013.01)

(58) Field of Classification Search
CPC .... B62D 35/005; B62D 35/02; B60K 11/085; B60K 11/08; F01P 5/06; F01P 11/10; F01P 7/10

See application file for complete search history.

(56) References Cited

U.S. PATENT DOCUMENTS

| | | | |
|---|---|---|---|
| 5,901,786 A * | 5/1999 | Patel | B60K 11/04 123/41.04 |
| 6,588,380 B2 | 7/2003 | Ries-Mueller | |
| 8,973,867 B2 * | 3/2015 | Eichholz | B64D 33/02 244/53 B |
| 9,738,329 B2 | 8/2017 | Yoon et al. | |
| 9,802,475 B2 * | 10/2017 | Wolf | B60K 11/085 |
| 10,081,400 B2 * | 9/2018 | Abdoul Azizou | H02P 6/16 |
| 10,577,034 B2 * | 3/2020 | Thompson | B62D 37/02 |
| 2011/0203861 A1 * | 8/2011 | Charnesky | B60K 11/085 180/68.1 |
| 2017/0240225 A1 * | 8/2017 | Gaylard | B60K 11/06 |

(Continued)

FOREIGN PATENT DOCUMENTS

| | | | |
|---|---|---|---|
| DE | 3600190 A1 * | 7/1986 | ............. F01P 11/10 |
| DE | 3600190 A1 | 7/1986 | |
| DE | 3735921 C1 * | 12/1988 | ............. B60K 11/08 |

(Continued)

*Primary Examiner* — Steve Clemmons
(74) *Attorney, Agent, or Firm* — Leydig, Voit & Mayer, Ltd.

(57) ABSTRACT

A motor vehicle front end has a heat exchanger and a cooling-air mechanism for controlling a supply of air to the heat exchanger. The cooling-air mechanism includes: a downwardly opening air inlet opening; and an air flap, which corresponds to the air inlet opening, and which, at its top edge, is articulatable on a body part in a pivotable manner via a pivot joint. The air flap is configured such that, in its closed position, it closes off the air inlet opening, and in its operative position, it opens up the air inlet opening, and as seen in a direction of travel of the motor vehicle, is situated in front of the air inlet opening.

14 Claims, 2 Drawing Sheets

(56) References Cited

U.S. PATENT DOCUMENTS

2018/0264933 A1\* 9/2018 Laurent ................ B62D 35/007

FOREIGN PATENT DOCUMENTS

| DE | 10019419 A1 | 10/2001 | |
|---|---|---|---|
| DE | 102010046147 A1 | 3/2012 | |
| DE | 102011056663 A1 \* | 6/2013 | ........... B60K 11/085 |
| DE | 102014106067 A1 \* | 11/2015 | ........... B60K 11/085 |
| DE | 102014219746 A1 \* | 3/2016 | ............. B60K 11/08 |
| DE | 102014219746 A1 | 3/2016 | |
| DE | 102015105567 A1 | 10/2016 | |
| DE | 102016202974 A1 | 3/2017 | |

\* cited by examiner

MOTOR VEHICLE FRONT END

CROSS-REFERENCE TO PRIOR APPLICATIONS

Priority is claimed to German Patent Application No. DE 10 2018 110 258.5, filed on Apr. 27, 2018, the entire disclosure of which is hereby incorporated by reference herein.

FIELD

The invention relates to a motor vehicle front end.

BACKGROUND

The cooling-air mechanism of a motor vehicle front end may have, as a single or additional air inlet, a downwardly opening air inlet opening which is generally arranged beneath a front bumper. A downwardly opening air inlet opening is to be understood in the present case as meaning an air inlet opening which opens in the downward direction to an appreciable extent and not exclusively in the forward direction, that is to say whose opening plane is forwardly inclined at less than 60° with respect to the horizontal.

DE 10 2015 105 567 A1 discloses a cooling-air mechanism with an obliquely downwardly opening lower air inlet opening which is assigned a spoiler, the spoiler, in the rest position, being folded inward and aerodynamically ineffective, and in the operative position, forming a small spoiler lip in the air inlet opening. A disadvantage of this cooling-air mechanism is inter alia that the air inlet opening is open at all times and, according to driving state or incident flow speed of the air, brings about an undesirably high propulsion resistance and/or front axle lift.

SUMMARY

An embodiment of the present invention provides a motor vehicle front end that has a heat exchanger and a cooling-air mechanism for controlling a supply of air to the heat exchanger. The cooling-air mechanism includes: a downwardly opening air inlet opening; and an air flap, which corresponds to the air inlet opening, and which, at its top edge, is articulatable on a body part in a pivotable manner via a pivot joint. The air flap is configured such that, in its closed position, it closes off the air inlet opening, and in its operative position, it opens up the air inlet opening, and as seen in a direction of travel of the motor vehicle, is situated in front of the air inlet opening.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
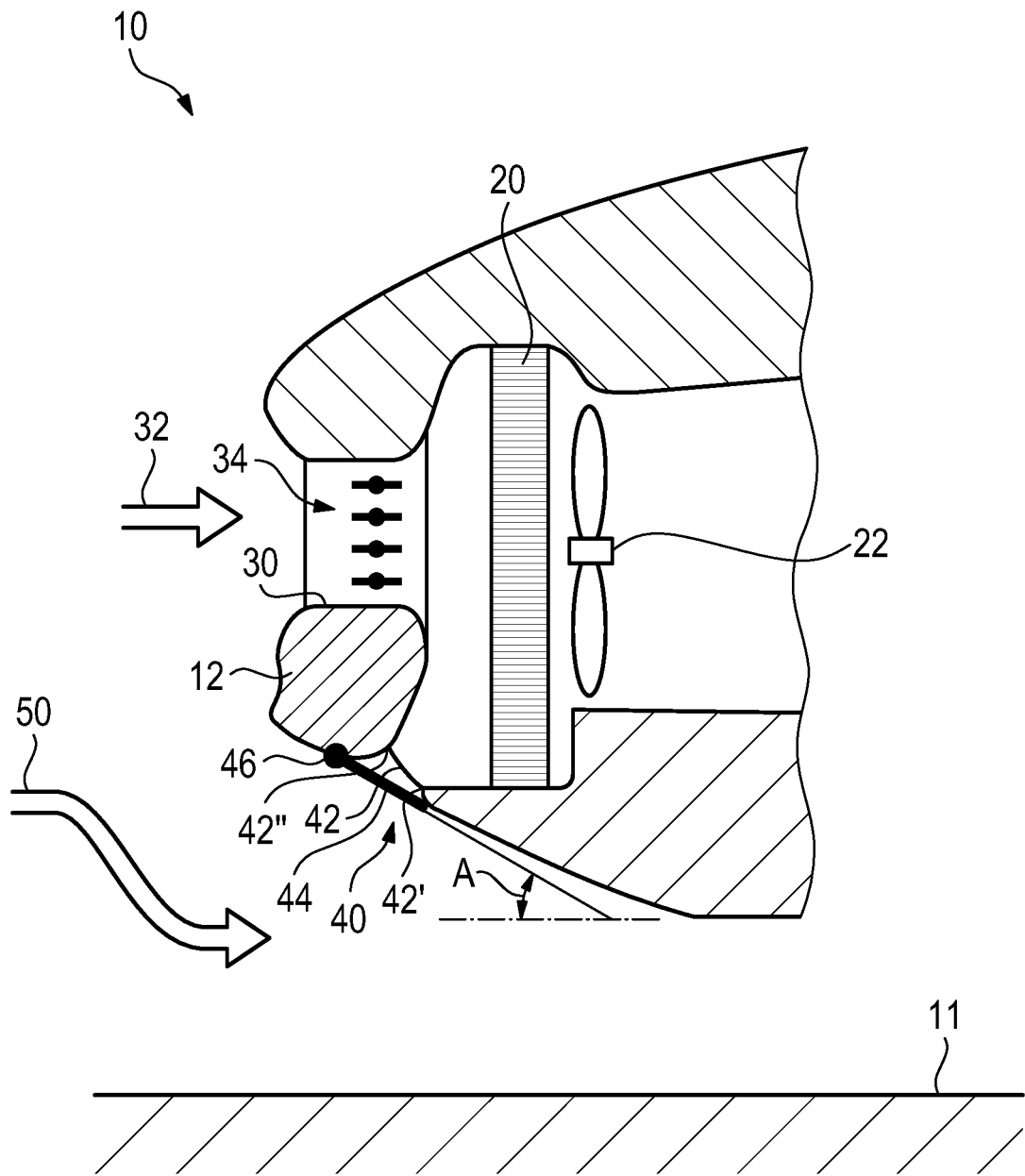
FIG. 1 shows a schematic longitudinal section through a motor vehicle front end according to the invention, having a heat exchanger and having a cooling-air mechanism, with an air flap in the closed position.

Embodiments of the present invention provide a motor vehicle front end for a motor vehicle with a front overhang angle of greater than 15°, having a heat exchanger and having a cooling-air mechanism for controlling the supply of air to the heat exchanger.

Embodiments of the invention provide a vehicle front end having a cooling-air mechanism with a downwardly opening air inlet opening, which has improved aerodynamic properties.

The vehicle front end according to embodiments of the invention has a heat exchanger and a cooling-air mechanism for controlling the supply of air to the heat exchanger. The cooling-air mechanism is formed by a downwardly opening air inlet opening and an air flap, which is assigned to the air inlet opening and which, at its top edge, is articulated on a body part in a pivotable manner by way of a pivot joint. A downwardly opening air inlet opening is to be understood in the present case as meaning an air inlet opening whose opening plane is downwardly inclined to a considerable extent, that is to say whose opening plane is forwardly inclined at at most 60° with respect to the horizontal. The air flap is articulated on a stationary body part in a pivotable and hanging manner.

The air flap is of large-area form such that, in its closed position, the air flap completely closes off the air inlet opening. In its open operative position, the air flap opens up the air inlet opening, and, as seen in the direction of travel, the flap is, in its operative position, situated completely in front of the air inlet opening. In the operative position, the air flap, as seen from the front, conceals at least most of the air inlet opening, wherein however, flow toward and flow through the realized open air inlet opening is realized from below or from below at the front.

In its closed position, the air inlet opening is completely closed, with the result that the air resistance of the motor vehicle front end is low. The closed position is thus suitable for all vehicle speeds with low cooling requirement.

In the open operative position of the air flap, the air inlet opening is opened up such that a cooling air stream can flow to the heat exchanger. The cooling air stream can, at correspondingly high vehicle speeds, be assisted in a passive or additionally active manner by a fan which is fluidically assigned to the heat exchanger. In the open operative position of the air flap, this also acts fluidically as a spoiler, whereby the air resistance is kept relatively low and the front axle lift is reduced.

Preferably, in the open operative position of the air flap, the bottom edge of the air flap is arranged lower than the bottom edge of the corresponding air inlet opening. This ensures that, fluidically, there is no direct flow toward the air inlet opening, but rather the air stream coming from the front is, to a considerable extent, diverted downward and swirled before it reaches and flows through the air inlet opening.

According to a preferred configuration of the invention, the length of the air flap between its pivot joint and the air flap bottom edge is at least as great as the length of the air inlet opening between its bottom edge and its top edge. In the present context, the length is to be understood as meaning the extent of the air flap in a longitudinal plane. Thus, the air flap is so long that, in the closed position, it completely covers and closes off the air inlet opening.

Preferably, the cooling-air mechanism has a separate second air inlet opening, which opens substantially in the forward direction and which is arranged above the downwardly opening air inlet opening. The cooling-air mechanism thus has two separate air inlet openings, these preferably however not necessarily being fluidically assigned to the same heat exchanger.

Particularly preferably, the forwardly opening air inlet opening can, with regard to its opening area, be formed to be considerably larger than the downwardly opening air inlet opening. The downwardly opening air inlet opening may be formed as a secondary air inlet opening, which is opened only if great cooling power is required.

According to one preferred configuration, the formation of the air flap and the corresponding flap seat on the body part is realized such that, in its closed position, the air flap closes off the air inlet opening in a manner flush with the body. This ensures low air resistance in the closed position of the air flap.

Preferably, in its operative position, the air flap is inclined such that it forms a front spoiler, which swirls in a turbulent manner the air flowing in in a laminar state such that the air resistance and the front axle lift are kept relatively low.

Particularly preferably, in the closed position of the air flap, the inclination angle of the air flap with respect to the horizontal is at least 15°. In the case of vehicles having a relatively large front overhang angle of greater than 15°, in particular, the described aerodynamic advantages are shown by the cooling-air mechanism according to the invention. This is in particular to do with the fact that direct or laminar incident flow to the correspondingly inclined air inlet opening is prevented by the air flap both in the closed position and in the operative position.

Preferably, in the open operative position of the air flap, the inclination angle of the air flap with respect to the horizontal is at least 80°. Thus, in its open operative position, the air flap is oriented almost vertically downward or, as seen from the articulation thereof, is inclined so as to be forwardly oriented. Consequently, a great spoiler effect is achieved, with the result that the air flowing in in a laminar state is swirled in a highly turbulent manner.

According to a preferred configuration of the invention, the pivot joint is in the form of a simple rotary joint.

An exemplary embodiment of the invention will be discussed in more detail below with reference to the drawings.

Figure 2:
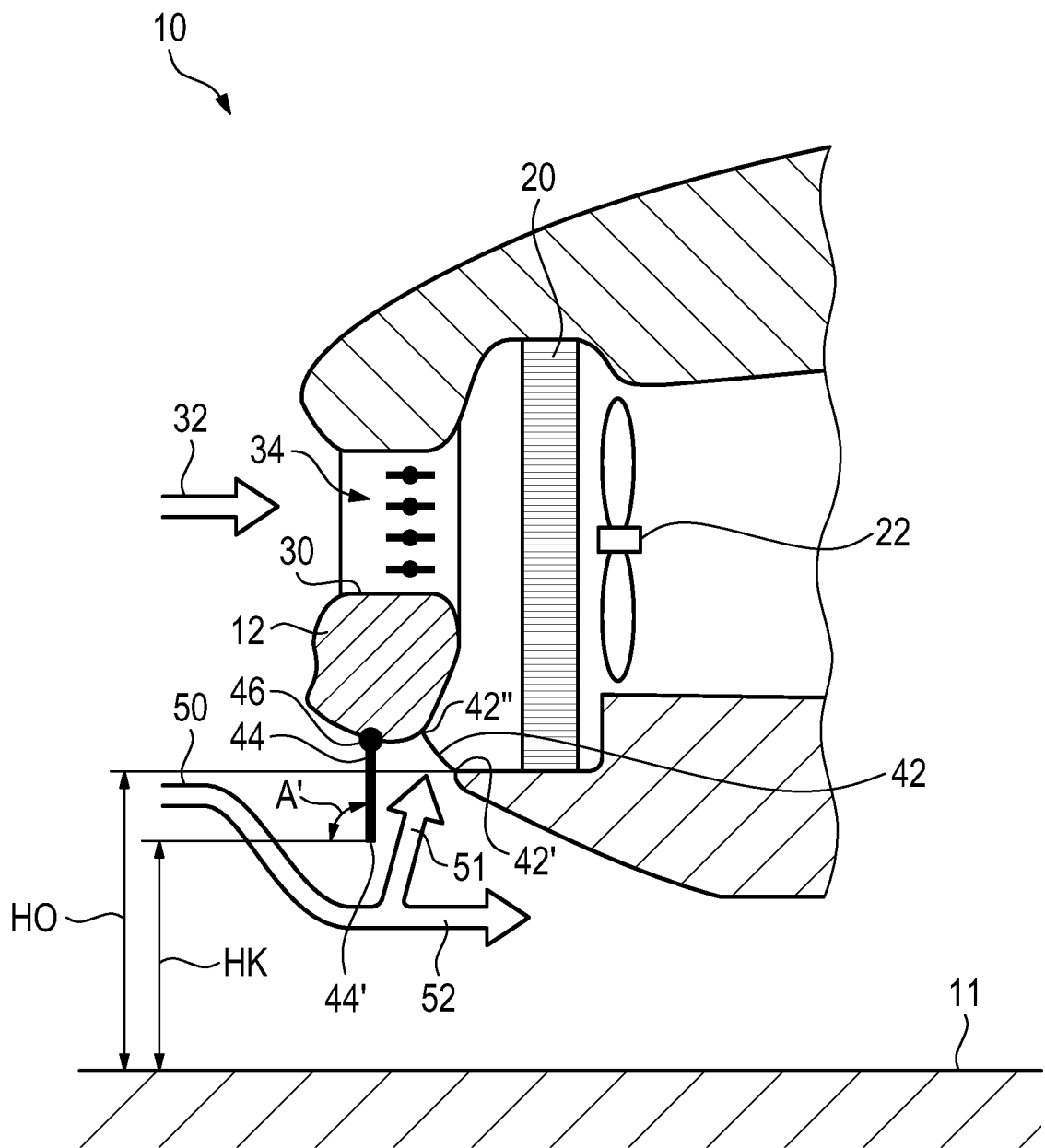
FIG. 2 shows the motor vehicle front end in FIG. 1 with the air flap in the open operative position.

A motor vehicle front end 10 of a motor vehicle with a front overhang angle of greater than 15° is illustrated in FIGS. 1 and 2. A heat exchanger 20, an electrical fan 22 arranged downstream of the heat exchanger 20, and a cooling-air mechanism for controlling the supply of air to the heat exchanger 20 are arranged in the motor vehicle front end 10. The cooling-air mechanism provides guidance and control for an upper air path 32 and a lower air path 50, which possibly both open out into the heat exchanger 20.

The upper air path 32 consists substantially of an upper air inlet opening 30, which opens in the forward direction and has a controllable flap arrangement 34 for fluidically opening or closing the air inlet opening 30. The upper air path 32 is arranged above a horizontal body part 12, which is in the form of a bumper, and approximately at the height of the heat exchanger 20.

Provided below the horizontal body part 12 is a substantially downwardly opening air inlet opening 42 which is assigned an air flap 40 which, by way of its upper edge, is articulated on the horizontal body part 12 in a pivotable manner via a pivot joint 46 in the form of a rotary joint. The length, in a vehicle longitudinal plane, of the air flap 44 between the pivot joint 46 and the air flap bottom edge 44' is greater than the length, in a vehicle longitudinal plane, of the air inlet opening 42 between its bottom edge 42' and its top edge 42".

The front inclination angle A of the closed air flap 40 with respect to the horizontal is approximately 30° in the present case. In the closed position illustrated in FIG. 1, the air flap 44 closes off the air inlet opening 42 completely and in a manner flush with the body, with the result that guidance past the downwardly opening air inlet opening 42 is realized completely and in a low-resistant manner for the lower air path 50.

In FIG. 2, the air flap 40 is illustrated in its open operative position, in which the air flap 40 assumes with its base plane a front inclination angle A' of approximately 90° with respect to the horizontal. The bottom edge 44' of the air flap 44 has, in relation to the vehicle contact plane 11, a smaller height HK than the height HO of the bottom edge 42' of the air inlet opening 42. In its open operative position, the air flap 40 forms in this way a front spoiler by which the air flowing in from the front in a laminar state is swirled in a highly turbulent manner.

The lower air path 50 is split into an underfloor partial air path 52 and into a cooling partial air path 51 which leads through the open air inlet opening 42 to the heat exchanger 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle front end comprising a heat exchanger and having a cooling-air mechanism for controlling a supply of air to the heat exchanger, the cooling-air mechanism comprising:
   a downwardly opening air inlet opening; and
   an air flap, which corresponds to the air inlet opening, and
      which, at its top edge, is articulatable on a body part in
      a pivotable manner via a pivot joint, wherein
      the air flap is configured such that, in its closed position,
         it closes off the air inlet opening, and in its operative position, it opens up the air inlet opening, and as seen in a direction of travel of the motor vehicle, is situated in front of the air inlet opening, wherein the body part is an exterior body part and the pivot joint is at an exterior surface of the body part.

2. The motor vehicle front end as claimed in claim 1, wherein, in the operative position, a bottom edge of the air flap is arranged lower than a bottom edge of the air inlet opening.

3. The motor vehicle front end as claimed in claim 1, wherein a length of the air flap between the pivot joint and an air flap bottom edge is at least as great as a length of the air inlet opening between its bottom edge and its top edge.

4. The motor vehicle front end as claimed in claim 1, wherein the cooling-air mechanism has, above the downwardly opening air inlet opening, a separate second air inlet opening, which opens in the forward direction.

5. The motor vehicle front end as claimed in claim 1, wherein, in the closed position, the air flap closes off the air inlet opening in a manner flush with the body part.

6. The motor vehicle front end as claimed in claim 1, wherein, in the operative position, the air flap forms a front spoiler.

7. The motor vehicle front end as claimed in claim 1, wherein, in the closed position of the air flap, an inclination angle of the air flap with respect to horizontal is at least 15°.

8. The motor vehicle front end as claimed in claim 1, wherein, in the operative position of the air flap, an inclination angle of the air flap with respect to horizontal is at least 80°.

9. The motor vehicle front end as claimed in claim 1, wherein the pivot joint is a rotary joint.

10. The motor vehicle front end as claimed in claim 1, wherein the body part is a bumper.

11. The motor vehicle front end as claimed in claim 1, wherein the downward opening air inlet opening has a forward inclination, the forward inclination being at most 60 degrees with respect to horizontal.

12. A motor vehicle comprising the motor vehicle front end as claimed in claim 1, wherein the motor vehicle has a front overhang angle of greater than 15 degrees.

13. The motor vehicle front end as claimed in claim 1, wherein the air flap is configured such that, in its closed position, the air flap is completely covers and close off the air inlet opening.

14. The motor vehicle front end as claimed in claim 1,
wherein, in the closed position of the air flap, an inclination angle of the air flap with respect to horizontal is at least 15° such that the air flap prevents direct or laminate incident flow to the air inlet, and wherein, in the operative position of the air flap, the inclination angle of the air flap with respect to horizontal is at least 80° such that the air flap prevents direct or laminate incident flow to the air inlet.

* * * * *